Jan. 24, 1928.
B. C. BRIDGHAM
1,656,998
ADJUSTABLE LIGHT REFLECTIVE TRANSMISSIVE ELEMENT
Filed Jan. 12, 1926
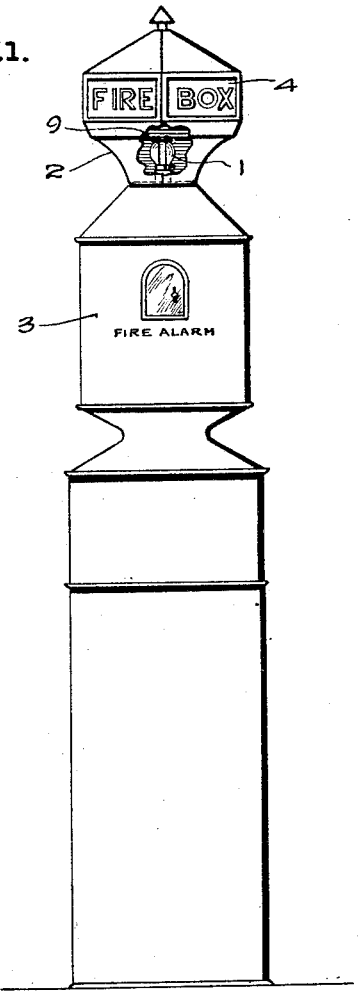
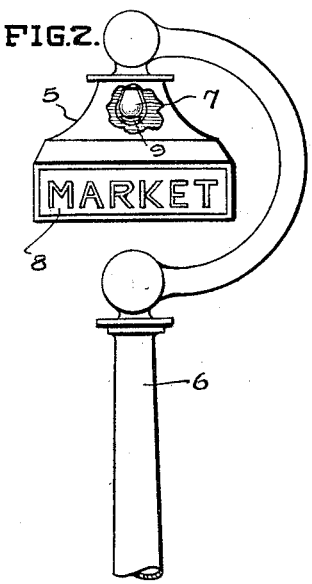
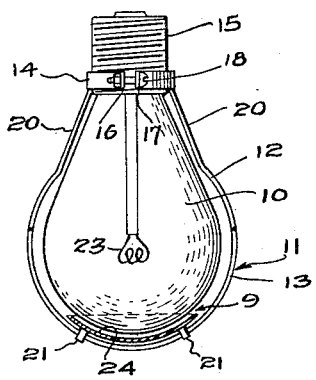
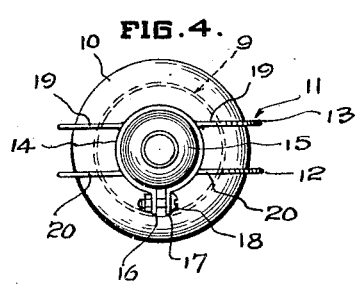
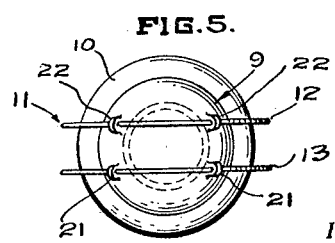
INVENTOR.
BARTON C. BRIDGHAM
BY Graves Griffith
ATTORNEY

UNITED STATES PATENT OFFICE.

BARTON C. BRIDGHAM, OF SAN FRANCISCO, CALIFORNIA.

ADJUSTABLE LIGHT REFLECTIVE-TRANSMISSIVE ELEMENT.

Application filed January 12, 1926. Serial No. 80,710.

The present invention relates to adjustable light reflective-transmissive elements and more particularly to those employed in connection with indirect lighting means for the illumination of transparent signs and displays, and has for its primary object the provision of an adjustable element of a translucent, semi-transparent or transparent character bearing a light surface coating of a reflective nature adaptable to both reflect and transmit light directed thereupon from an illuminant, as an aid in the creation of a softened light of uniform diffusion, the adjustibility of the element being relative to the illuminant.

Another object of the invention is the provision of a light reflective-transmissive element adapted to function both as a reflector and a transmitter of the light as received from a common illuminant, adjustable relative thereto, reflecting one portion of the light received therefrom upon a system of fixed reflective elements and transmitting directly another portion, thereby affording a means whereby indirect illumination of transparent signs and displays may be secured.

A further object is the provision of an adjustable light reflective-transmissive element adaptable for use in combination with a fixed reflective system constituted of a plurality of convex surfaces of predetermined and variable curvatures and so positioned as to present their convex faces toward an illuminant.

An additional object is the provision of an adjustable means of the character specified, so constructed and arranged as to be readily attachable to any standard electric bulb and movable into any desired position relative thereto.

Other objects and advantages of my invention will become apparent upon reference to the specification and accompanying one sheet of drawings, in which;

Figure 1 is a front elevation of an ordinary fire-alarm standard, showing an illuminated sign mounted thereon in accordance with my invention, including an embodiment of my adjustable light reflective-transmissive element as applied to the electric bulb;

Figure 2 is a side elevation, showing an application of my adjustable light reflective-transmissive element to the electric bulb of a street lamp;

Figure 3 is an enlarged view of an electric bulb, showing the method of securing the frame of the light reflective-transmissive element to the bulb, this element being in section and positioned directly below the illuminant, as illustrated in Figure 2.

Figure 4 is a top plan view of the light bulb, showing the frame of the light reflective-transmissive element clamped in position; and Figure 5 is a bottom plan view, showing the light reflective-transmissive element in place, as illustrated in Figure 3.

In the accompanying drawings, I have shown my invention as applied for the illumination of a fire-alarm box and a street lamp, though it is to be understood that it is equally applicable for use in various other directions not herein specifically pointed out.

In the embodiment of my invention illustrated in Figure 1, there is comprised an illuminant 1, in the form of an electric bulb, mounted in a fixed reflective system 2, which, in this instance, is secured to the top of a fire-alarm standard 3 and adapted to illuminate the transparent plates mounted in the frame above the reflector 2.

In Figure 2, I have illustrated a similar reflective system 5 borne by a lamp standard 6, having an illuminant 7 and transparent plates 8, the reflective system 5 being here in reversed position to that shown in Figure 1, but of the same general design.

The adjustable light reflective-transmissive element 9 is of like curvature to that of the electric bulb to which it is intended to be attached and may be of any suitable translucent, semi-transparent or transparent material adapted to carry a light surface coating of a semi-reflective character and both permeable to and reflective of the light impinging upon its surface. The element 9 is held in spaced relationship to the electric bulb surface by means of a wire frame 11 comprised of a pair of circular sections 12 and 13 concentrically arranged with respect to the center of the spherical portion of the said electric bulb 10 and in parallelism relative to each other, the two sections being held in spaced relation by means of a split-clamp member 14 adapted to adjustably embrace the electric bulb plug 15 and to be clamped thereto by means of ears 16 and 17 bearing a clamp screw 18, the said wire sections 12 and 13 bearing extensions 19 and 20 which are rigidly secured to the clamp member 14 in any suitable manner.

The light reflective-transmissive element 9 is held in spaced relationship to the spherical portion of the electric bulb 10 by means of sets of small perforated lugs 21 and 22 secured to the under convex surface thereof, said lugs being radially arranged relative to the center of the spherical portion of said bulb and the circular sections 12 and 13 of the frame 11, so as to permit movement of the element 9 in any desired direction about the spherical portion and equally spaced from the illuminant 23, whatever the position.

Either surface 24, but preferably the outer, of the element 9 is provided with a light coating of any well-known reflective substance, this being of a character to reflect a portion of the light impinging thereon and to, also, permit another portion to pass directly therethrough, the element 9 bearing this coating being spaced sufficiently from the electric bulb 10 to afford an airspace therebetween of an extent to guard against the possible vaporization or destruction of the light reflective-transmissive coating, through heat transmission from the illuminant.

Where desired or necessity may require, two of the elements 9 may be used on the same frame, or an additional frame of like design may be employed for the purpose and secured to the clamp member 14 and arranged intermediate the frame 11.

I claim:

In a device of the character described, the combination with a reflective member constituted of a plurality of convex reflective surfaces, of an electric light bulb, a split clamp member adapted for clamping about the screw plug of said bulb, a frame consisting of a pair of spaced apart and parallel wires encompassing lengthwise said bulb, conforming to the contour thereof, spaced therefrom and supported at their free extremities by said clamp member, lugs uniting and slidably borne by said wires, and a light transmissive-reflective element carried by said lugs.

In testimony whereof I have affixed my signature.

BARTON C. BRIDGHAM.